United States Patent
Ramamoorthy et al.

(10) Patent No.: US 7,162,924 B2
(45) Date of Patent: Jan. 16, 2007

(54) METHOD AND SYSTEM FOR ANALYZING CAVITATION

(75) Inventors: Chandra Ramamoorthy, Aurora, IL (US); Arthur Milkowski, Sugar Grove, IL (US); Gregory B. Moebs, East Peoria, IL (US); Priyatosh Barman, Naperville, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/320,748

(22) Filed: Dec. 17, 2002

(65) Prior Publication Data

US 2004/0112115 A1    Jun. 17, 2004

(51) Int. Cl.
*G01H 3/10* (2006.01)

(52) U.S. Cl. ............................. 73/590; 73/86

(58) Field of Classification Search .............. 73/1.01, 73/159, 73
See application file for complete search history.

(56) References Cited

U.S. PATENT DOCUMENTS 3,381,525 A * 5/1968 Kartluke et al. .............. 73/590
3,548,640 A * 12/1970 Fowler et al. ................ 73/590
4,588,440 A * 5/1986 Simoneau ..................... 420/36
5,074,150 A * 12/1991 Tirelli et al. .................. 73/590
5,472,620 A * 12/1995 Huang ........................ 210/748
5,514,329 A * 5/1996 McCaul et al. ............... 420/56
5,676,015 A * 10/1997 Sheen et al. ................... 73/73

FOREIGN PATENT DOCUMENTS

JP    2002267584 A  *  9/2002

\* cited by examiner

*Primary Examiner*—Hezron Williams
*Assistant Examiner*—Paul M. West
(74) *Attorney, Agent, or Firm*—Finnegan, Henderson, Farabow, Garrett & Dunner (57) ABSTRACT

A method for analyzing cavitation in a component includes establishing an energy level associated with a system condition associated with the component and analyzing cavitation in response to said energy level.

23 Claims, 8 Drawing Sheets

FIG. 2

| FLOW (lpm) | ① | | ② | | ③ | | ④ | | ⑤ | |
|---|---|---|---|---|---|---|---|---|---|---|
| | MPa | kW | MPa | kW | MPa | kW | MPa | kW | MPa | kW |
| 250 | 10 | 42 | | | | | | | | |
| 335 | | | 15 | 84 | 25 | 140 | 30 | 168 | | |
| 450 | | | 15 | 113 | 25 | 188 | 30 | 225 | 22 | 248 |
| 535 | | | | | | | 30 | 268 | 33 | 295 |

METHOD AND SYSTEM FOR ANALYZING CAVITATION

TECHNICAL FIELD

The present invention relates generally to components, such as control valves, and, more particularly, to a method and system for measuring, analyzing, and/or predicting cavitation in such components.

BACKGROUND

Hydraulic systems are becoming increasingly more sophisticated and are being used to yield ever increasing power and benefits. This increase in sophistication and output, however, has required an increase in the level and performance of these systems. Previous performance gains generally required increasing the amount of fluid flow or allowing increased pressures. These increases sometimes led to failure resulting from cavitation damage.

Cavitation may damage main control valves. Cavitation is a phenomenon that occurs when the speed or velocity of a fluid increases such that the pressure in the system drops below the vapor pressure of the liquid. The fissures that are created are voids of intense energy. When these fissures contact the surface of a valve or other component, cavitation damage may occur. For example, the cavitation damage may cause failure of a main control valve, resulting in potential downtime of equipment, as well as warranty exposure and negative commercial effects for the manufacturer.

Previously, valve designs were tested and analyzed iteratively. Variables were tested one at a time and determined either through experience or engineered guesses. Design solutions were not tested over multiple variables, and further, many hundred man-hours of resources were expended. Even when experiments were designed to include multiple variables, cavitation was still unable to be measured and analyzed. This inability to measure and analyze cavitation prohibited the ability to predict damage and, further, to account for possible cavitation effects in valve design.

The present invention is directed to overcoming one or more of the problems or disadvantages associated with the prior art.

SUMMARY OF THE INVENTION

In one exemplary aspect, the present disclosure is directed to a method for analyzing cavitation in a component. The method includes establishing an energy level associated with a system condition associated with the component and analyzing cavitation in response to said energy level.

According to another exemplary aspect, a system for analyzing cavitation in a component includes at least one sensing device associated with the component, wherein the sensing device being configured to sense an energy level of an object. The system also includes a controller configured to establish an energy level associated with a system condition of the component and to analyze cavitation in response to said energy level and said sensed energy level.

In yet another exemplary aspect, the present disclosure is directed to a method for designing a component. The method includes establishing an initial design for the component, determining a cavitation signature for the component, determining a system condition at which a cavitation region impacts a surface of the component, identifying locations of potential impact of cavitation regions with a surface of the component, and modifying the initial design based on the identified locations of potential cavitation impact.

In still another exemplary aspect, the present disclosure is directed to a method for analyzing cavitation associated with a component. The method includes determining a cavitation signature for the component and determining at least one system condition associated with a cavitation region impacting a surface of the component.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
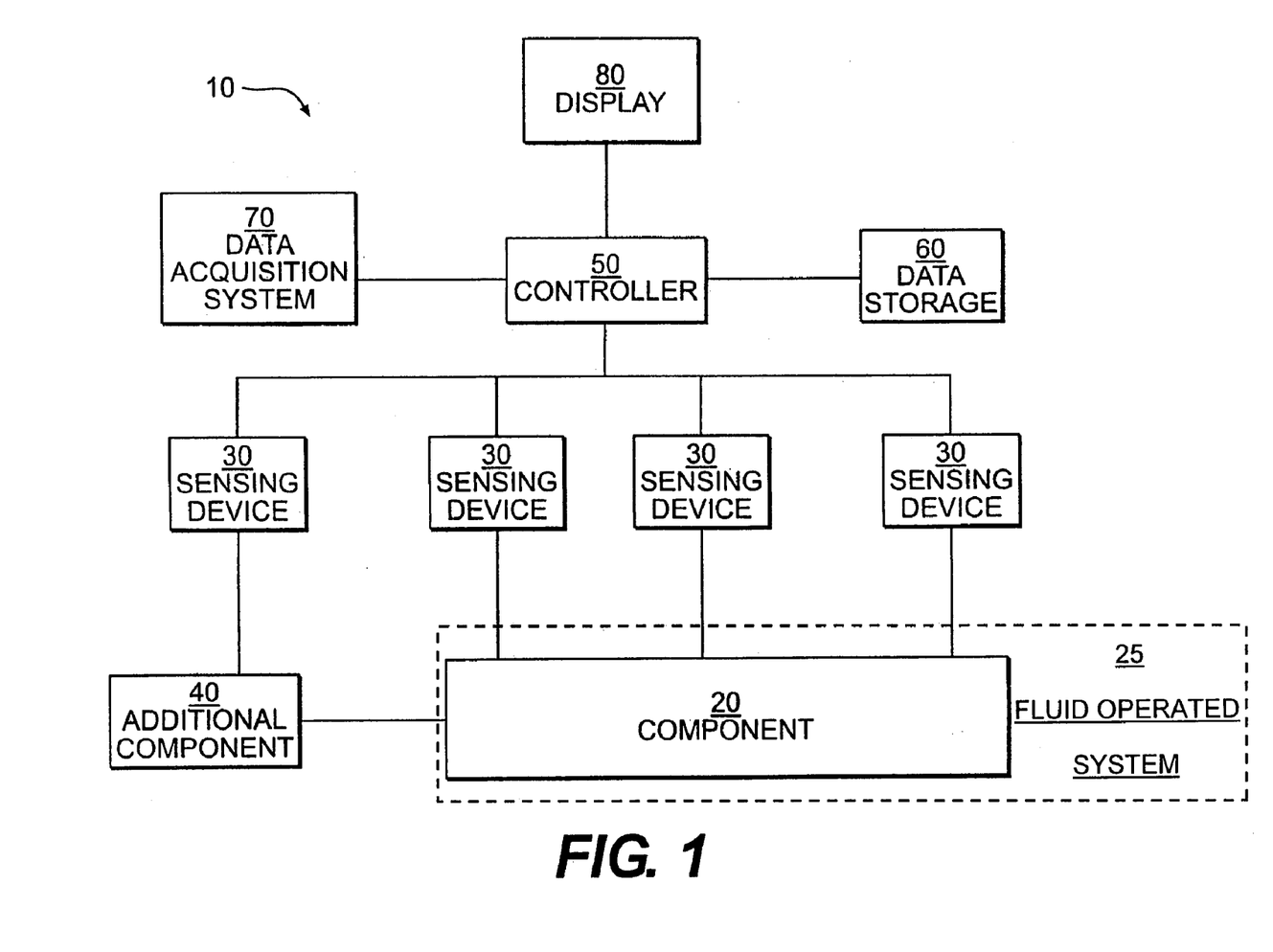
FIG. 1 is a block diagram of a system for measuring, analyzing, and/or predicting cavitation, consistent with an exemplary embodiment of the present invention.

Referring to FIG. 1, an exemplary system 10 for analyzing cavitation. Analyzing cavitation may include measuring cavitation, determining impact of cavitation, and/or predicting cavitation. The system 10 may include a component 20 configured for use in a fluid-operated system 25. One or more sensing devices may be coupled to the component 20 so as to sense characteristics, for example, energy characteristics, associated with at least one system condition at or associated with the component 20. The sensing devices 30 may be directly or indirectly connected to the component 20. For example, assuming the component 20 is a valve, one or more sensing devices 30 may be located at a valve wall, a valve spool, or a component 40 connected the valve component 20.

The sensing devices 30 may be electrically coupled to a controller 50. The controller 50 may be configured to monitor signals received from the sensing devices 30, for example, signals associated with a sensed energy. The controller 50 may also store values associated with the signals in a data storage 60 and/or analyze the signals from the sensing devices. In an embodiment, the controller 50 may monitor several channels associated with the sensing devices 30. The controller 50 may be associated with a data acquisition system 70. One exemplary data acquisition system capable of monitoring several channels in the 100 KHz range is made by Phillips. The controller 50 may analyze the energy in the component to predict impact of a cavitation region with a surface of the component 20, to determine when impact is occurring, and/or to assist with design or re-design of the component 20.

The controller 50 may be associated with a display 80 configured to display received and/or analyzed information to a user. For example, the controller 50 may be programmed with instructions to perform computational analysis of the signals from the sensing-devices 30 and to provide an output on the display 80 understandable by a user.

Figure 2:
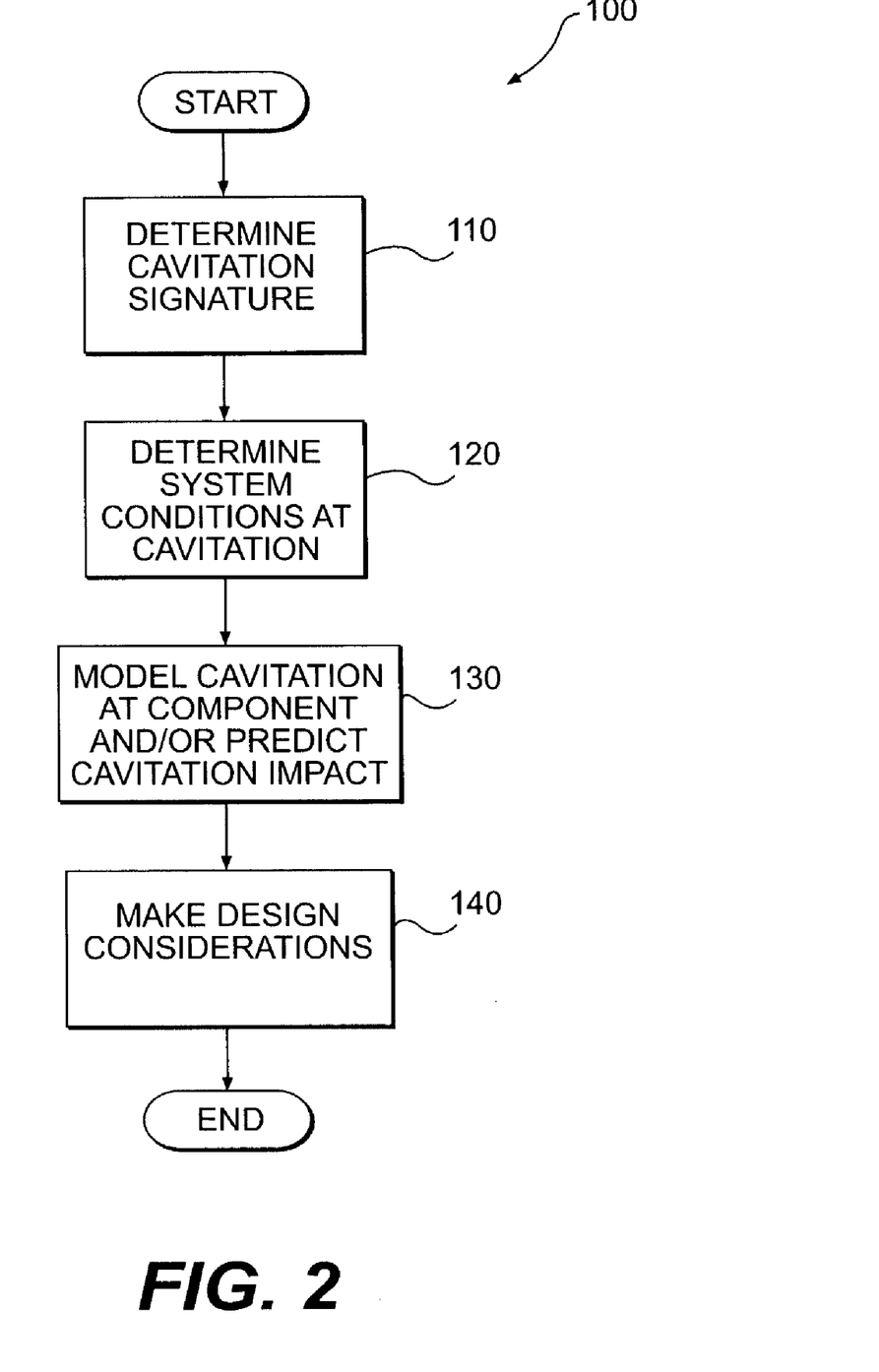
FIG. 2 is a flow chart illustrating a method for measuring, analyzing, and predicting cavitation, consistent with an exemplary embodiment of the present invention.

FIG. 2 is a flow chart illustrating an exemplary method 100 of analyzing cavitation, consistent with an exemplary embodiment of the present invention. First, in step 110, a signature of the cavitation for a component 20, such as a valve, is determined. The signature of the cavitation may include an energy pattern for one or more system conditions of or associated with the component 20. One exemplary method for determining the signature of the cavitation is to establish an energy associated with initial system conditions of the component and monitor the component for a dramatic increase in the energy, for example, an increase that is clearly greater than a system noise.

For example, the sensing devices 30 may include one or more devices, such as accelerometers, which are capable of measuring the amount of energy of an object, for example, the component 20, a plurality of components, or a system including components. Where the component 20 is a valve, the sensing devices 30 may be capable of measuring the amount of energy in the valve and/or in one or more spools in the valve, the energy being associated with the fluid flow through the component. Alternatively or additionally, the sensing devices 30 may include transducers. The sensing devices 30 can also detect changes in energy associated with the component 20, for example, when a cavitation region impacts the component 20, inducing energy to a valve and/or a spool in the valve. The sensing devices 30 may be selected so as to be capable of detecting a rapid rise in energy in the component 20.

In order to confidently detect signals associated with an impact a frequency range, the data acquisition system 70 operates at a sampling rate to ensure signal accuracy. For example, the sampling rate may be between two and three times the expected frequency of the energy associated with impact of a cavitation region with the surface of the component 20. In an exemplary embodiment, if a cavitation region impact the surface of the component 20 at a frequency of about 40 kHz, the data acquisition system 70 may sample the signals from the sensing devices 30 at about 100 kHz.

Signals from the sensing devices 30 indicative of energy at the component at the initial system conditions may be monitored and/or analyzed by the controller 50 and/or the data acquisition system 70. System conditions in the component may then be controllably varied while the energy of the component is being sensed by the sensing devices 30. For example, in one embodiment, fluid flow through the component may be increased incrementally. Exemplary system conditions that may be sensed and/or monitored by the system 10 include fluid conditions, such as flow rate at the component 20 (in 1 pm or liters per minute), fluid pressure at the component 20 (in Mpa or mega-pascals), power, for example, horsepower, at the component (in KW or kilowatts), component positions, for example, valve displacement (in mm or millimeters) or valve position, pump displacement, and/or pump flow rate.

At some point in time and at a certain frequency or frequency range, a dramatic energy increase may be detected by one or more of the sensing devices 30, signaling energy being induced to the component 20 as the energy voids from the cavitation region impact a surface of the component 20. Thus, the controller 50 and/or the data acquisition system 70 may determine that the frequency at which the dramatic energy increase occurs is the frequency at which cavitation impacts a surface of the component 20. The cavitation signature for the component 20 may include the energy level and/or system conditions associated with the component 20 when a cavitation region impacts a surface of the component 20 and/or the frequency range at which the impact is sensed by the sensing devices 30.

Figure 3:
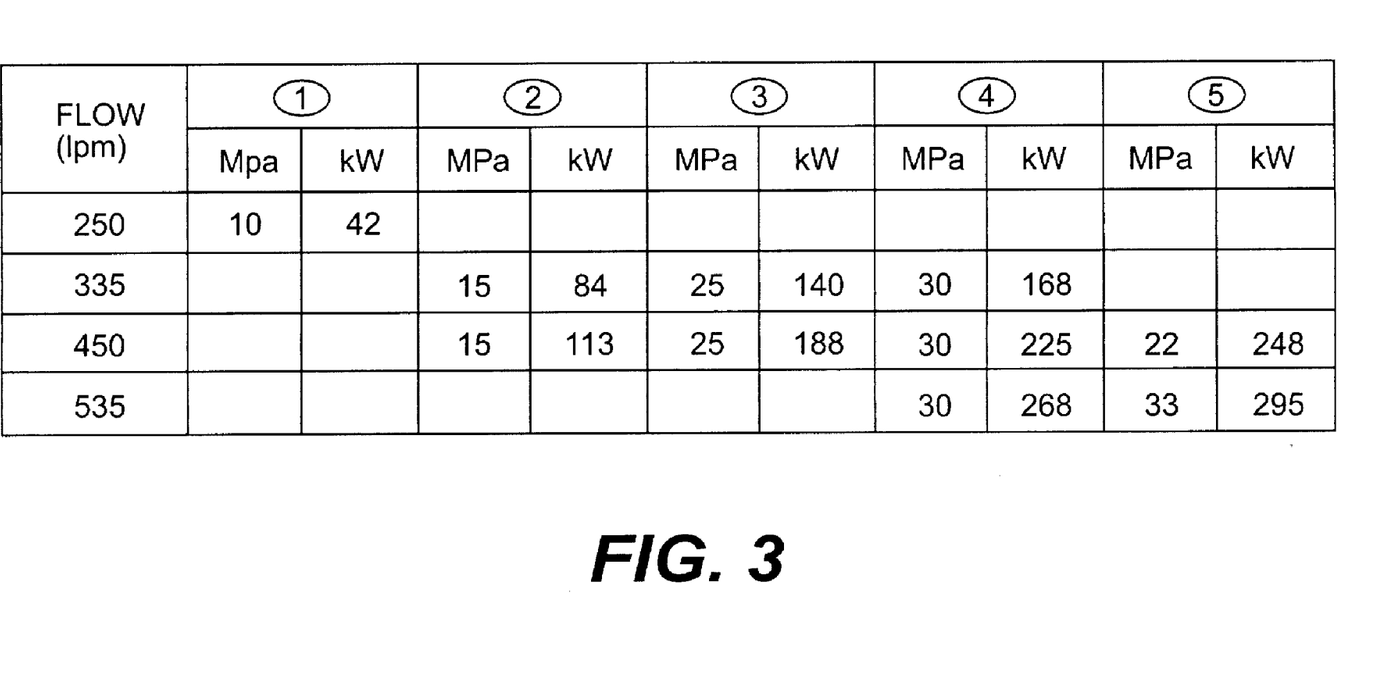
FIG. 3 is an exemplary matrix of hydraulic power, consistent with an embodiment of the present invention.

FIG. 3 illustrates the organization of the fluid conditions, for example, the different flow rates and pressures associated with different component positions used during the analysis, for example, each of columns 1–5 represents a different valve location. The power matrix of FIG. 3 may be used to correlate energy analysis with the associated system conditions such as valve position, power, fluid flow, fluid pressure, and the like.

Figure 4:
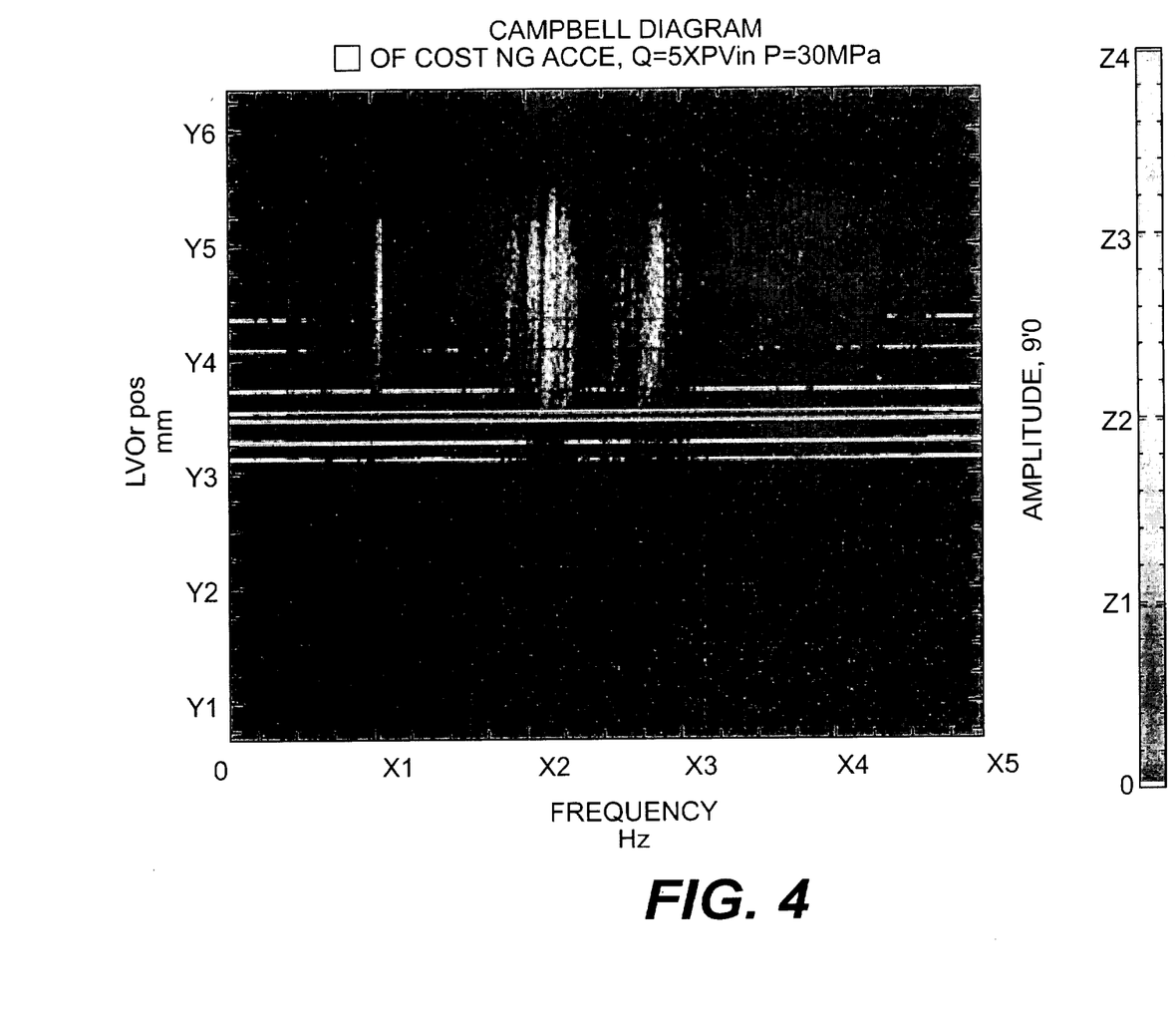
FIG. 4 is an exemplary spectral map, illustrating spool position versus energy frequency, consistent with an embodiment of the present invention.

In step 120, the fluid conditions at which impact of a cavitation region with the component 20 occurred are determined. The signals being monitored by the controller 50 and/or the data acquisition system may then be correlated with the system conditions associated with the signals, for example, the position of the valve spool at the time the corresponding energy levels were sensed. In one embodiment, the position of the valve spool corresponding to the highest energy levels is correlated. One exemplary method for determining system conditions associated with cavitation impact is to slowly actuate the valve through a range of valve positions while energy levels are sensed. In one embodiment, the valve is actuated to a maximum displacement value while measuring the energy levels associated with each displacement increment of the valve or valve spool. An energy analysis, such as a spectral map, such as illustrated in FIG. 4, then may be plotted depicting energy concentration versus spool displacement. It should be understood that cavitation impact with the component 20 may occur at one or more combinations of fluid flow rate and valve spool position.

In step 130, the controller 50 may optionally be configured to model cavitation at the component and/or predict potential cavitation impact based on the determined cavitation signature of the fluid conditions associated with impact of a cavitation region with the component 20. Using simulation techniques, for example, computational fluid dynamics, a model of cavitation associated with the component can be derived from an energy analysis, such as the spectral map illustrated in FIG. 4. Prediction could occur by comparing current fluid conditions with previous fluid conditions at which cavitation did occur. For example, information regarding the previous conditions at which cavitation did occur may be stored in a database, and the current fluid conditions can be compared to the previous conditions.

Figure 5:
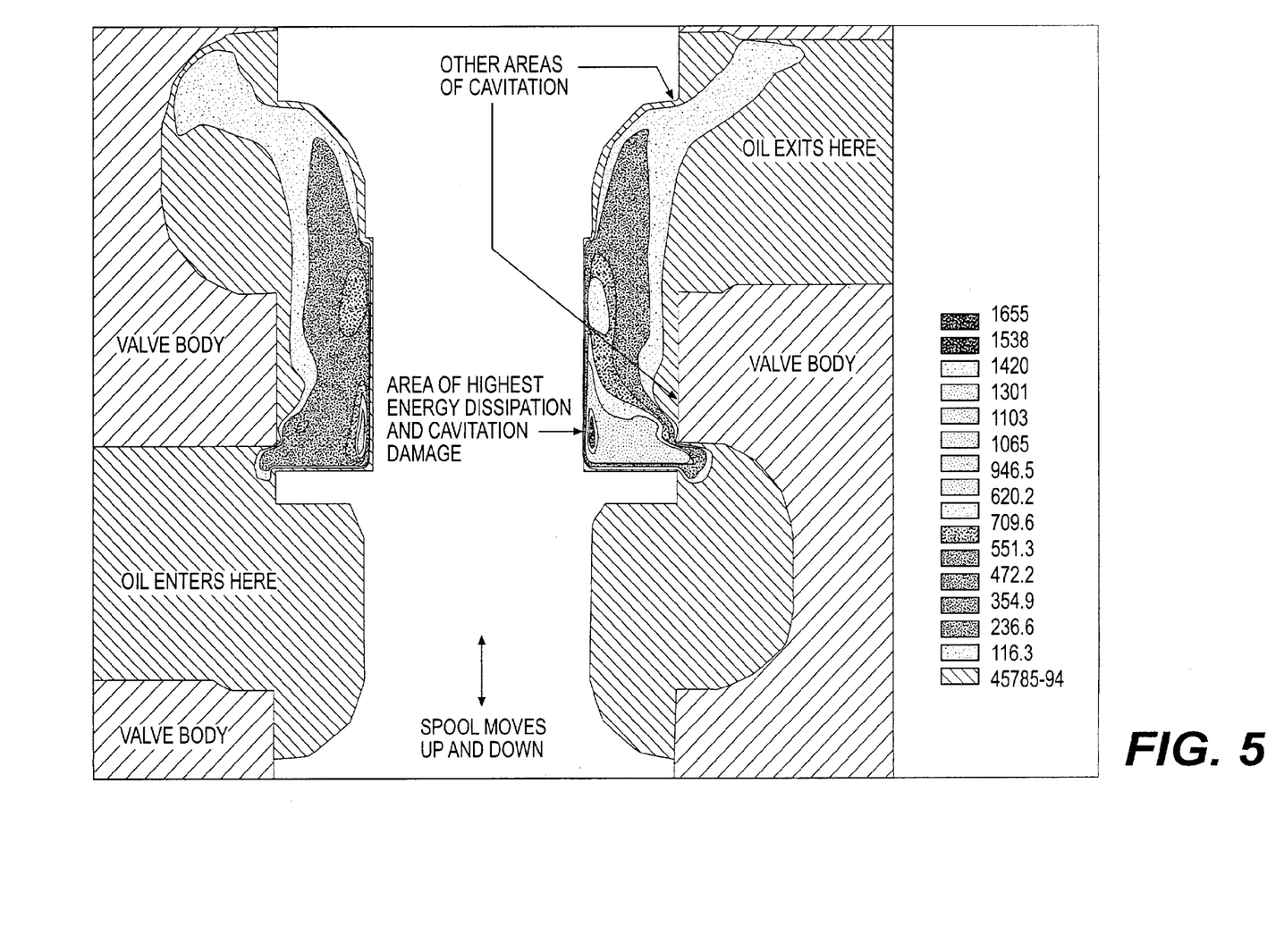
FIG. 5 is an exemplary energy dissipation plot, consistent with an embodiment of the present invention.

An exemplary energy dissipation plot is illustrated in FIG. 5. For example, a two-dimensional cross-section of the valve can be illustrated and the points of energy dissipation can be located. The energy dissipation plot of FIG. 5 may be established using computational fluid dynamics software or other simulation techniques. Such techniques provide for modeling characteristics associated with the fluid flow in the valve. For example, computational fluid dynamics may be used to model an area of high energy dissipation of the fluid flowing through the valve. Although the area of high energy dissipation may be located through these simulations, it does not necessarily follow that cavitation damage occurs at this point, as the valve may be able to absorb the energy. That is, the transfer of energy may be at an acceptable level. The simulation, however, does provide indications of where the energy dissipation does occur, and thus, when combined with an analysis of the actual energy dissipated, may indicate where damage may occur.

Figure 6:
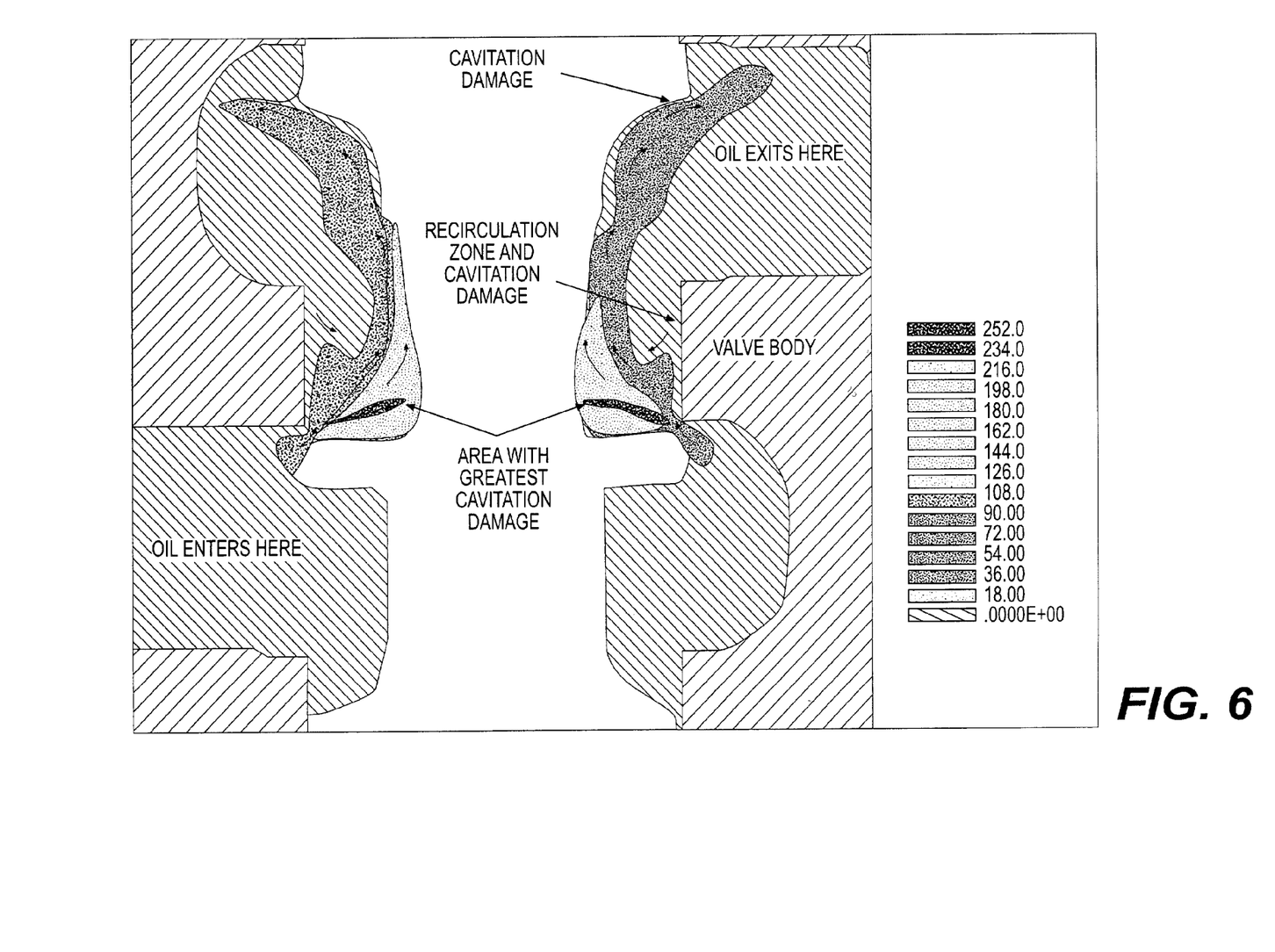
FIG. 6 is an exemplary velocity distribution profile, consistent with an embodiment of the present invention.

A velocity distribution plot indicative of the fluid velocity through the component 20 or other portion of the fluid system may be combined with the energy dissipation plot to identify potential cavitation areas. An exemplary velocity distribution profile is illustrated in FIG. 6. For example, one possible cavitation site is an area of recirculation, where an area of low pressure is situated next to an area of high velocity. Another possible cavitation site is an area where the flow changes direction suddenly. A sudden change in flow direction may cause any cavitation bubbles to hit the surface causing damage.

Figure 7:
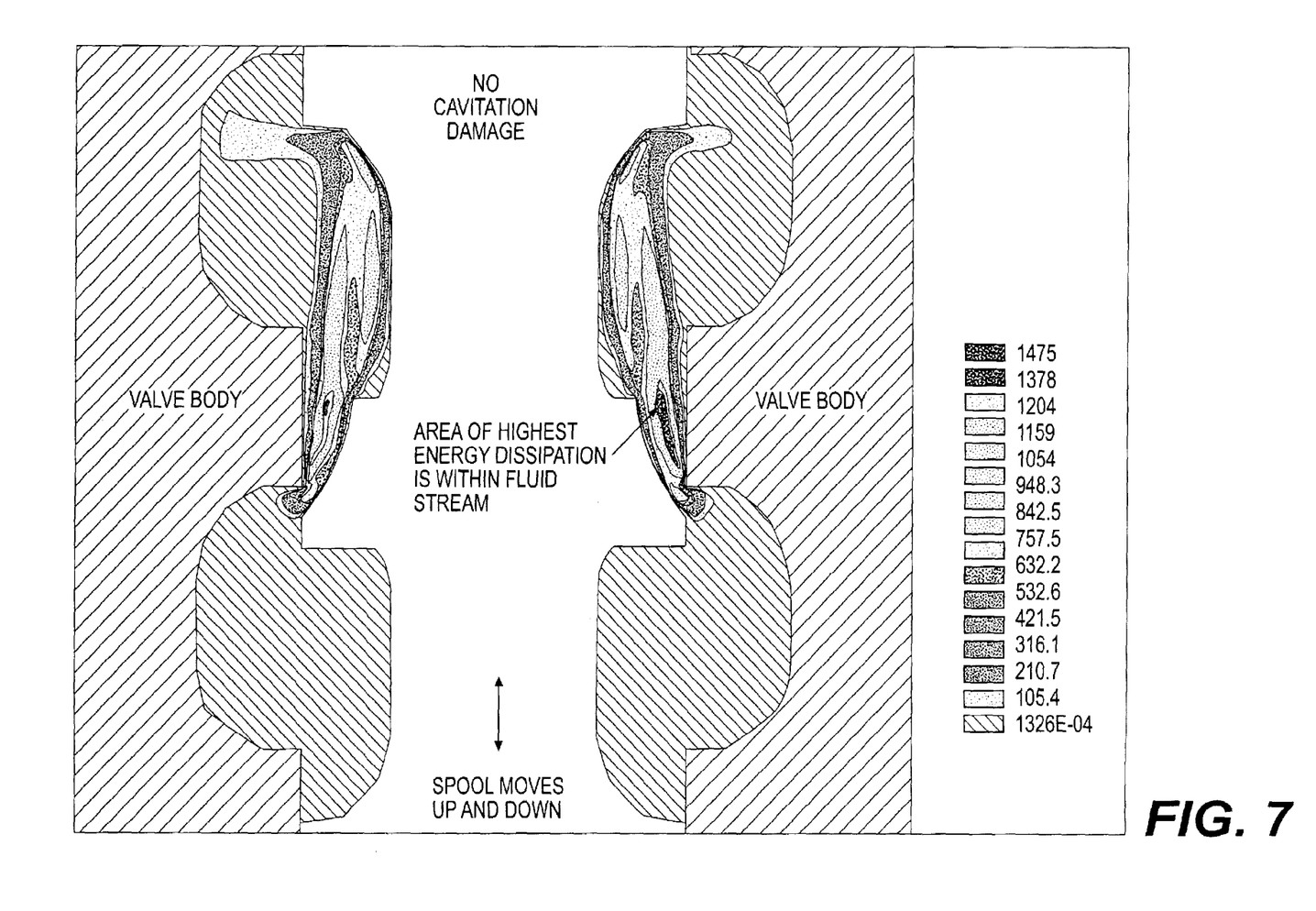
FIG. 7 is an exemplary energy dissipation plot of a redesigned valve, consistent with an embodiment of the present invention.

In optional step 140, design considerations, for example, design changes, can be made to the component and evaluated based on the analysis, for example, data and models, derived in steps 110–130. An exemplary energy dissipation plot for a modified valve design is illustrated in FIG. 7. For example, it may be desirable to modify the valve design until the area of highest energy dissipation is located in the fluid, away from the metal surfaces of the valve, thus reducing possible damage. Design modification may also modify the velocity profile, thereby eliminating recirculation zones or other possible cavitation sites.

Figure 8:
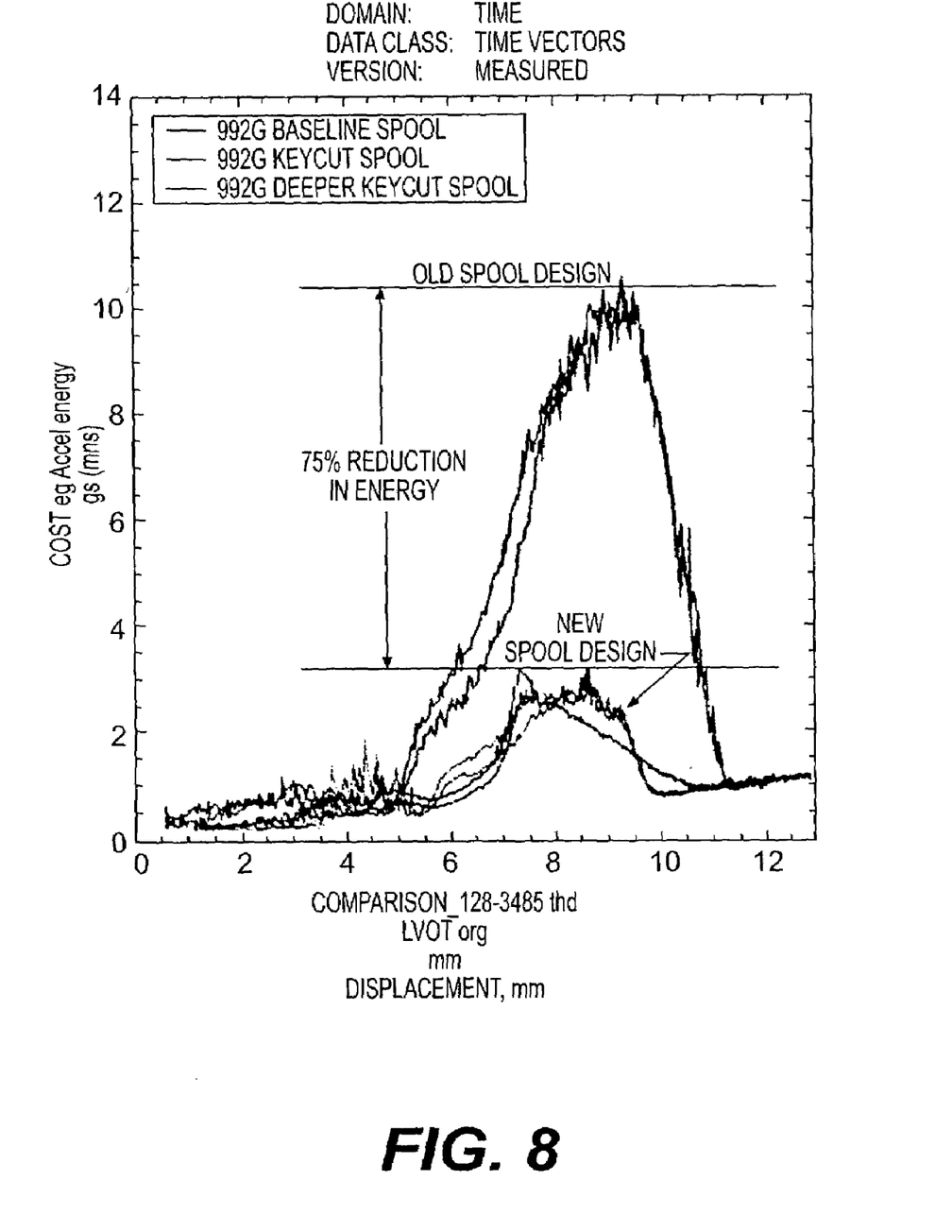
FIG. 8 is an exemplary energy analysis plot, consistent with an embodiment of the present invention.

FIG. 8 is an energy analysis plot that may also be useful in valve design. For example, FIG. 8 may indicate the energy dissipation for a respective valve position and other system conditions. Based on the energy dissipation and system conditions information, it may be determined that for particular fluid conditions, the predicted energy transfer is undesirable. The same fluid conditions may be analyzed using computational fluid dynamics to determine a location in the valve where the energy transfer problem is occurring. From the information provided by computational fluid dynamics, valve design decisions may be made.

It should be appreciated that many approaches may be taken to address and/or resolve valve cavitation problems. For example, the strength of the material of the component 20 may be increased, the component 20 may be reinforced at certain locations, the configuration of the component 20 may be redesigned, the flow characteristics in the component 20 may be redesigned, operation input parameters may be controlled to avoid cavitation problems, and the like. Determining a cavitation signature and determining system conditions at which cavitation impact occurs allow for various approaches and/or design choices to address and/or resolve cavitation problems.

According to another aspect, a cost benefit analysis can be performed. The cost benefit analysis may include determining an effect of cavitation impact, determining a cost of strengthening the component 20 to withstand impact, determining component design options, and determining a desirable design based on one or more of the previous determinations. It should be appreciated that the component 20 may be strengthened by, for example, changing the material of the component, changing the thickness of the material, and/or the like. The cost benefit analysis may also include determining a warranty and/or maintenance effect of the component design. In addition, the cost benefit analysis may also include determining an impact of limiting the system conditions of the component 20.

In addition to valve design, the energy analysis plot of FIG. 8 may be used to determine appropriate system conditions of particular valve designs. For example, the energy analysis plot may be used to determine an appropriate power limit for the component, in order for the operator to avoid operating in a condition of undesirable energy transfer. For example, if cavitation problems occur in fluid systems located in the field, it may be acceptable to determine system conditions where cavitation occurs and map around them, especially if there are few regions. This may be an acceptable and cost effective solution, as opposed to refitting an existing system with a new component design. In yet another embodiment, by monitoring system conditions, it can be determined when the valves are nearing an undesirable operating condition, such as an excess energy transfer level. Based on this monitoring, operating conditions may be dynamically controlled to avoid the undesirable condition.

Optionally, the system 10 may be configured to determine a location where a cavitation region impacts a surface of the component 20. For example, a plurality of sensing devices 30 may be placed at different locations on the component 20. The strength and/or timing of sensed signals associated with cavitation impact may then be correlated, for example, by triangulation or other mathematical techniques, to determine the location of impact.

INDUSTRIAL APPLICABILITY

The system 10 may be used is various operations relating to the analysis of cavitation. For example, in one embodiment, the system 10 may be used to measure energy levels associated with the component 20 and to analyze cavitation based on the energy levels. The analysis may include determining the impact of a cavitation region with a surface of the component 20 in response to the measured energy levels.

In another embodiment, the system 10 may be used to determine an acceptable energy level for the component 20, monitor the energy levels associated with the component 20, and modify a design of the component 20 in response to the monitored energy levels, for example, when the monitored energy levels exceed the acceptable energy level.

In yet another embodiment, the system 10 may be used to determine an acceptable energy level for the component 20, monitor the energy levels associated with the component 20, and determine system conditions at the component 20 when the monitored energy levels are acceptable. The system 10 may then be used to predict impact of a cavitation region with a surface of the component 20 and/or to determine system conditions at the component 20 when impact occurs. The system 10 may also be used to take an action to reduce impact of a cavitation region with a surface of the component 20, for example, increase material strength of the component 20 to withstand the energy levels, redesign the component 20, for example, a valve, to avoid impact at certain energy levels, and/or map operation of the component 20 around the energy levels so that an operator cannot control the component 20 into an operation having cavitation impact.

Methods and systems are thus provided to permit cavitation analysis, for example, measuring cavitation, determining cavitation impact, and/or predicting cavitation. Such methods and systems offer significant benefits over prior systems. For example, rather than approaching an increase in hydraulic demand by simply increasing the flow, a set of metrics, including spectral maps, are available for design assistance. Further, the data may be used to determine the maximum hydraulic power for a given valve, potentially enabling machines to be used at a higher level without sacrificing quality. Finally, the design process itself is made more efficient. Instead of creating a design and then spending extensive man-hours and resources testing such a design through iterative processes, the design itself can be improved, and possibly optimized, in a short period of time using fewer resources.

It will be apparent to those skilled in the art that various modifications and variations can be made in system and method for analyzing cavitation of the present invention without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A method of analyzing cavitation in a component of a fluid system, comprising:
    establishing an energy level associated with a system condition associated with the component of the fluid system;
    analyzing cavitation in response to said energy level;
    sensing the energy level associated with the system condition of a component;
    determining an energy level associated with cavitation impact on a surface of the component; and
    determining a position of impact based on the energy level and the system condition.

2. The method of claim 1,
    wherein determining an energy level associated with cavitation impact on a surface of the component includes establishing a normal range of energy levels associated with the system condition of the component indicative of a lack of cavitation impacting the surface of the component and determining when the sensed energy increases to a level outside the normal range.

3. The method of claim 2, further including determining when a cavitation region impacts a surface associated with the component.

4. The method of claim 3, further including determining the system condition at time of impact.

5. The method of claim 2, wherein said sensing energy includes positioning a sensing device at a surface associated with the component.

6. The method of claim 2, wherein said sensing includes sensing energy levels while varying the system condition.

7. The method of claim 1, including
    determining a cavitation signature for the component; and
    determining at least one system condition associated with a cavitation region impacting a surface of the component.

8. The method of claim 7, further including determining desirable operating conditions for the component based on the system condition associated with said impacting.

9. A method of designing a component, comprising analyzing cavitation in accordance with claim 7;
    determining an effect of cavitation impact on the component;
    determining a cost of strengthening the component to withstand said cavitation impact;
    determining component design options; and
    determining a desirable component design based on at least one of said cost of strengthening and said design options.

10. The method of claim 9, further including determining a cost of at least one of warranty and maintenance of the component design.

11. The method of claim 9, further including determining an impact of limiting system conditions of the component.

12. A method of analyzing cavitation in a component of a fluid system, comprising:
    establishing an energy level associated with a system condition associated with the component of the fluid system;
    analyzing cavitation in response to said energy level;
    sensing the energy level associated with the system condition of a component; and
    determining an energy level associated with cavitation impact on a surface of the component,
    wherein said analyzing includes predicting an additional system condition and a location of the component at which cavitation impact will occur.

13. The method of claim 12, further including modifying at least one of a design of the component, a material of the component, and an operation of the component.

14. The method of claim 12,
    wherein the system condition includes at least one of valve position, fluid flow, fluid pressure, and power.

15. A system of analyzing cavitation in a component of a fluid system, comprising:
    at least one sensing device associated with the component of the fluid system, the sensing device being configured to sense an energy level of an object; and
    a controller configured to establish an energy level associated with a system condition of the component in response to said sensed energy levels, to analyze cavitation in response to said energy level, to determine an energy level associated with cavitation impact on a surface of the component, and to determine a position of impact based on the energy level and the system condition.

16. The system of claim 15,
    wherein the controller is configured to determine an energy level associated with cavitation impact on a surface of the component by establishing a normal range of energy levels associated with the system condition of the component indicative of a lack of cavitation impacting the surface of the component and determining when the sensed energy increases to a level outside the normal range.

17. The system of claim 16, wherein the controller is further configured to determine when a cavitation region impacts a surface associated with the component.

18. The system of claim 17, wherein the controller is further configured to determine the system condition at time of impact.

19. A system of analyzing cavitation in a component of a fluid system, comprising:
    at least one sensing device associated with the component of the fluid system, the sensing device being configured to sense an energy level of an object; and
    a controller configured to establish an energy level associated wit condition of the component in response to said sensed energy levels, to analyze cavitation in response to said energy level, to determine an energy level associated with cavitation impact on a surface of the component, and to predict an additional system condition and a location of the component at which cavitation impact will occur.

20. The system of claim 19, wherein at least one of a design of the component, a material of the component, and an operation of the component is modified based on output of the controller.

21. The system of claim 19,
wherein the system condition includes at least one of valve position, fluid flow, fluid pressure, and power.

22. A method of designing a component, the method comprising:

establishing an initial design for the component;
providing the system of claim 19;
determining a system condition at which a cavitation region impacts a surface of the component;
determining a cavitation signature for the component; and
identifying at least one location of potential impact of cavitation regions with a surface of the component.

23. The method of claim 22, further including modifying the initial design based on the identified locations of potential cavitation impact.

* * * * *